United States Patent
Costinsky (10) Patent No.: US 8,381,276 B2
(45) Date of Patent: Feb. 19, 2013

(54) SAFE URL SHORTENING

(75) Inventor: Poul A. Costinsky, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 327 days.

(21) Appl. No.: 12/861,416

(22) Filed: Aug. 23, 2010

(65) Prior Publication Data

US 2012/0047577 A1 Feb. 23, 2012

(51) Int. Cl.
*H04L 29/06* (2006.01)
(52) U.S. Cl. .......................................................... 726/6
(58) Field of Classification Search ........................ 726/6
See application file for complete search history.

(56) References Cited

U.S. PATENT DOCUMENTS

| | | | |
|---|---|---|---|
| 7,181,455 B2 | 2/2007 | Wookey et al. | |
| 7,698,269 B2 | 4/2010 | Zhou et al. | |
| 2006/0235991 A1* | 10/2006 | Brown et al. | 709/233 |
| 2007/0136279 A1* | 6/2007 | Zhou et al. | 707/6 |
| 2009/0070873 A1* | 3/2009 | McAfee et al. | 726/23 |
| 2011/0022681 A1* | 1/2011 | Simeonov | 709/217 |
| 2011/0047013 A1* | 2/2011 | McKenzie, III | 705/14.4 |
| 2011/0145435 A1* | 6/2011 | Bhatawdekar et al. | 709/238 |
| 2011/0173683 A1* | 7/2011 | Roach | 726/4 |
| 2011/0191849 A1* | 8/2011 | Jayaraman et al. | 726/23 |
| 2012/0005702 A1* | 1/2012 | Tindell | 725/14 |

OTHER PUBLICATIONS

Mohit, "Safe2Click.me—Checks If a URL Is Safe to Click", Retrieved at <<http://www.sitestouse.com/safe2click-me-checks-if-a-url-is-safe-to-click/>> Published Date: Jan. 26, 2010, pp. 2.
Copland, Jane, "The Benefits and Pitfalls of URL Shorteners", Retrieved at <<http://www.seomoz.org/blog/the-benefits-and-pitfalls-of-url-shorteners>> Published Date: Sep. 10, 2008, pp. 35.
Criddle, Linda, "Mitigate Risks When Using Shortened URL's", Retrieved at <<http://safeinternet.org/blog/mitigate-risks-when-using-shortened-url%E2%80%99s>> Published Date: Feb. 17, 2010, pp. 3.
Moss, Julian, "Why Use Url Shorteners?", Retrieved at <<http://www.articledashboard.com/Article/Why-use-URL-shorteners-/214118>> Retrieved Date: Jun. 30, 2010, pp. 2.
"URL Expander Alternatives", Retrieved at <<http://www.clybs.com/urlexpander/alternatives, Retrieved Date: Jun. 30, 2010, pp. 3.
"URL Shorteners Make the Web Substantially Slower; Facebooks' fb.me Is Slowest", Retrieved at <<http://blog.watchmouse.com/2010/03/url-shorteners-make-the-web-substantially-slower-facebooks-fb-me-is-slowest/>> Retrieved Date: Jun. 30, 2010, pp. 8.

* cited by examiner

Primary Examiner — Michael S McNally
(74) Attorney, Agent, or Firm — Turk IP Law, LLC (57) ABSTRACT

A safe URL shortening service creates a short URL from any valid long URL. At resolution time, the service determines if the resulting URL points to a known bad, known good, or unknown site. Depending on the determination results, the service may redirect a user to the target site, block redirection, or present a warning page that allows the user to manually activate the target link.

17 Claims, 6 Drawing Sheets

SAFE URL SHORTENING

BACKGROUND

Domain names are linked to IP addresses. For ease of use, characters of the Latin alphabet are typically used. Some web developers tend to pass descriptive attributes in the URL to represent data hierarchies, command structures, transaction paths and session information. As a result, very long URLs may be created making it difficult for users to type or remember. Uniform Resource Locator (URL) shortening is a technique on the World Wide Web in which a URL may be made substantially shorter in length. The technique involves using a Hypertext Transfer Protocol (HTTP) redirect on a domain name that is short to link to a website which has a long URL. URL shortening sites have become increasingly popular enabling URLs of any length to be shortened to easy-to-remember/type versions.

A short URL obscures the target address, and as a result it may be used to redirect to an unexpected site. Thus, malicious behaviors like rick-rolling, redirecting to scam and affiliate websites, or shock sites may take advantage of this web tool. URL shortening websites may inadvertently distribute spyware. Opaqueness is also used by spammers, who use such links in spam to bypass URL blacklists. It is typically impossible for a user to know from the short URL whether or not it points to a suspicious site, so users can be conned into clicking malicious links.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing safe URL shortening services. A safe URL shortening service according to embodiments may create a short URL from any valid long URL. At resolution time, the service may determine if the resulting URL points to a known bad, known good, or unknown site. Depending on the determination results, the service may redirect a user to the target site, block redirection, or present a warning page that allows the user to manually activate the target link.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, safe URL shortening may be provided by merging short URL resolution and safety check of the target URL. The safety of the target URL may be determined at the moment of use. Furthermore, measures like account throttling, where links created by restricted users are limited to a configurable number of clicks per day, may limits spread of new malicious content. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing safe URL shortening services. Examples of platforms include, but are not limited to, a hosted service executed over a plurality of servers, an application executed on a single server, and comparable systems. The term "server" refers to a computing device executing one or more software programs typically in a networked environment. The term "client" refers to a computing device or software application that provides a user access to data and other software applications through a network connection with other clients and/or servers. More detail on these technologies and example operations is provided below.

Figure 1:
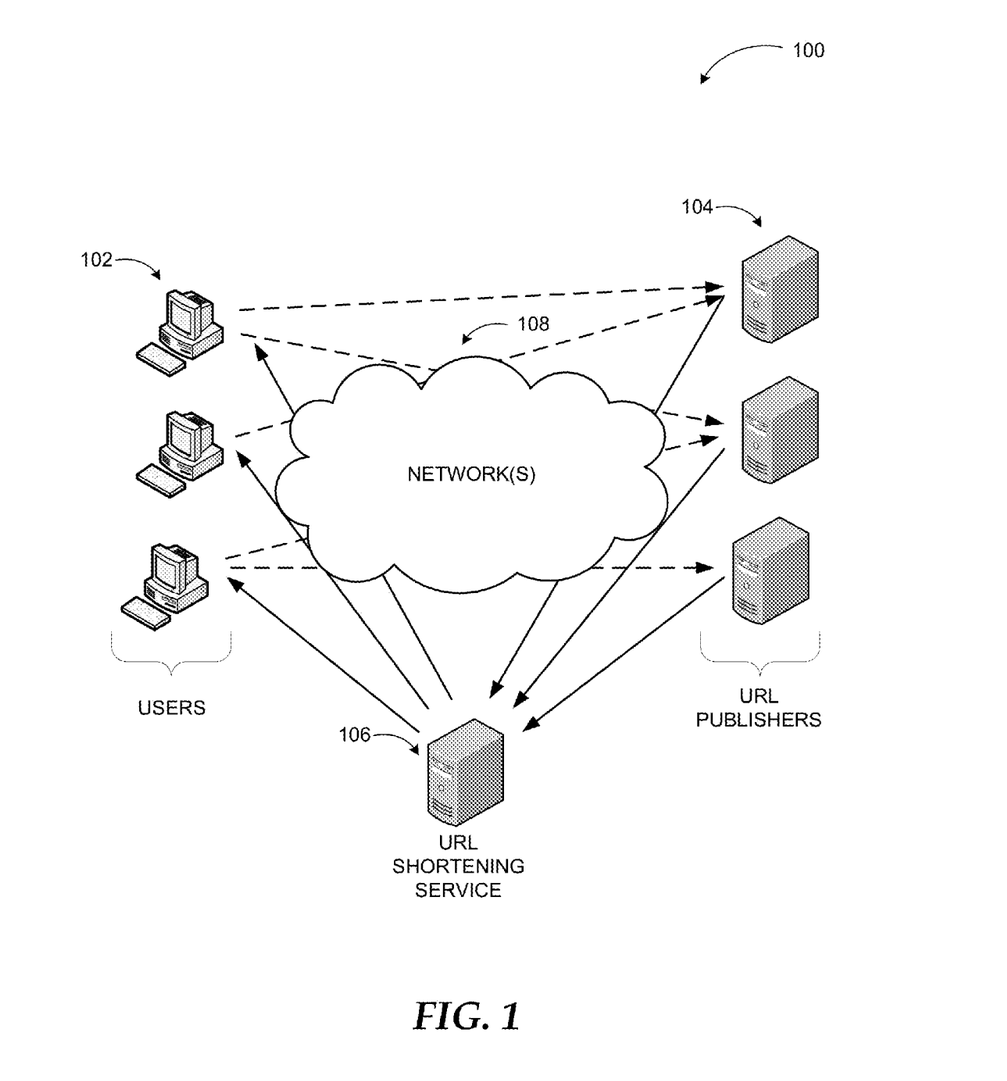
FIG. 1 illustrates interactions between a URL shortening service, users, and URL publishers in an example networked system.

FIG. 1 illustrates interactions between a URL shortening service, users, and URL publishers in an example networked system. As discussed above, long domain names or descriptive attributes in the URL to represent data hierarchies, command structures, transaction paths, etc. may result in long URLs difficult type or remember. URL shortening services transform a long URL into a short (typically alphanumeric) URL employing various techniques. For example, the URL "http://en.myexampleurl.com/w/index.php?title=short URL&diff=283621022&oldid=283308287" may be shortened to "http://shorturl.com/mmw6lb".

In addition to the difficulty in remembering or typing long URLs, many instant messaging services have total character limits for messages. Using a URL shortening service can enable users to include a URL that would not fit in its long form. While a number of techniques may be used for shortening long URLs, a majority of such techniques employ a key. Long URLs are associated with a key, which is the part after http://domain.tld/. For example http://myexampleurl.com/m3q2xt has a key of m3q2xt.

According to some techniques, the keys may be generated numerically in base 36 assuming 26 letters and 10 numbers. The keys in order would be 0, 1, 2, ..., 9, a, b, ..., z. If uppercase and lowercase letters are accepted then the number can be in base 62 (26+26+10). Other techniques utilize a hash function, which can be made or a random number generated so that key sequence is not predictable. In yet other approaches, the users may propose their own keys. For example, "http://en.myexampleurl.com/w/index.php?title=short URL&diff=283621022&oldid=283308287" may be shortened to "http://shorturl.com/testkey", where "testkey" is provided by a user.

URL shortening is a special kind of URL redirection, which may be used in spamming, pranks, phishing, or affiliate hiding. A system according to embodiments checks the original URL for potential abuse when resolving the short URL. The system can then provide redirection services to the users preventing malicious abuse of the shortening process.

Diagram 100 illustrates an example system. URL publishers 104 may be any website providing a long URL. A URL publisher may be the website owner, a website user, or any other entity associated with a website that creates a long version of the URL (e.g. one with descriptive attributes). Users 102 are recipients of the URLs that activate the links in order to access the target website and/or service. URL shortening service 106 communicates with URL publishers 104 and users 102 over networks 108 and provides users with a transformed URL (short URL). In providing this service, URL shortening service 106 may perform safety check as discussed above preventing abusive sites.

Figure 2:
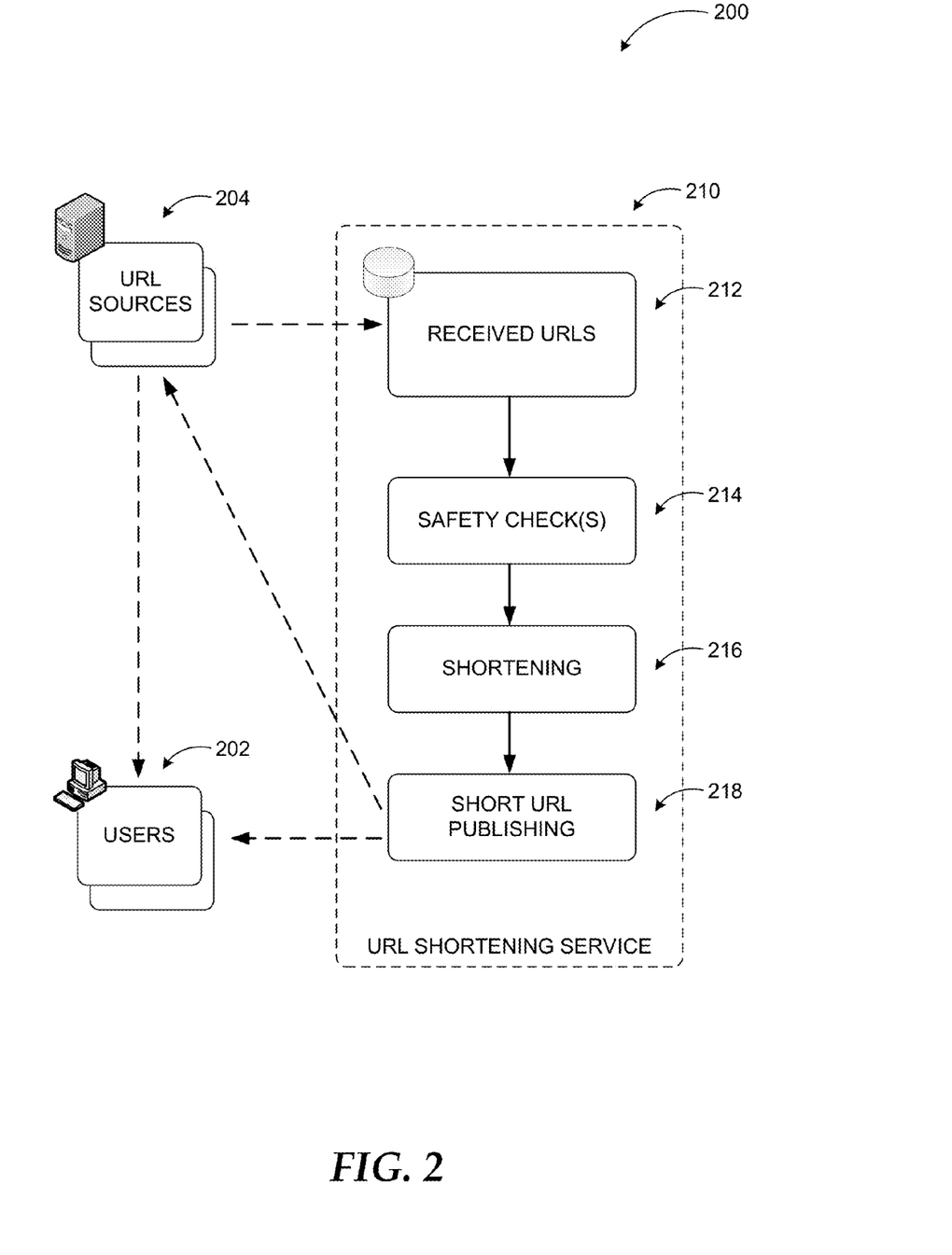
FIG. 2 is a conceptual diagram illustrating major components in safely shortening URLs in a system according to embodiments.

FIG. 2 is a conceptual diagram illustrating major components in safely shortening URLs in a system according to embodiments. As shown in diagram 200, a URL shortening service 210 may include a number of functional blocks such as received URLs block 212 for long URLs to be hashed (or transformed through other methods) to short URLs, safety status check block 214 for determining safe or unsafe (or unknown) websites/URLs, shortening block 216 for the actual transformation of the target URL to a short URL, and short URL publishing block 218 for providing the short URL to a user (202) or URL source 204, which in turn can provide the short URL to its users.

The URL shortening service 210 may also be integrated into a website and be transparent to a user. In addition to providing safety assessment of target URLs, such a service may collect data on user behavior, link statistics, etc. for websites or maintain login information for repeat users. Safety checks may be performed through a number of methods such as websites registering with the service, third party safety lists, machine learning algorithms, mining of collected data, user feedback, and comparable approaches.

Figure 3:
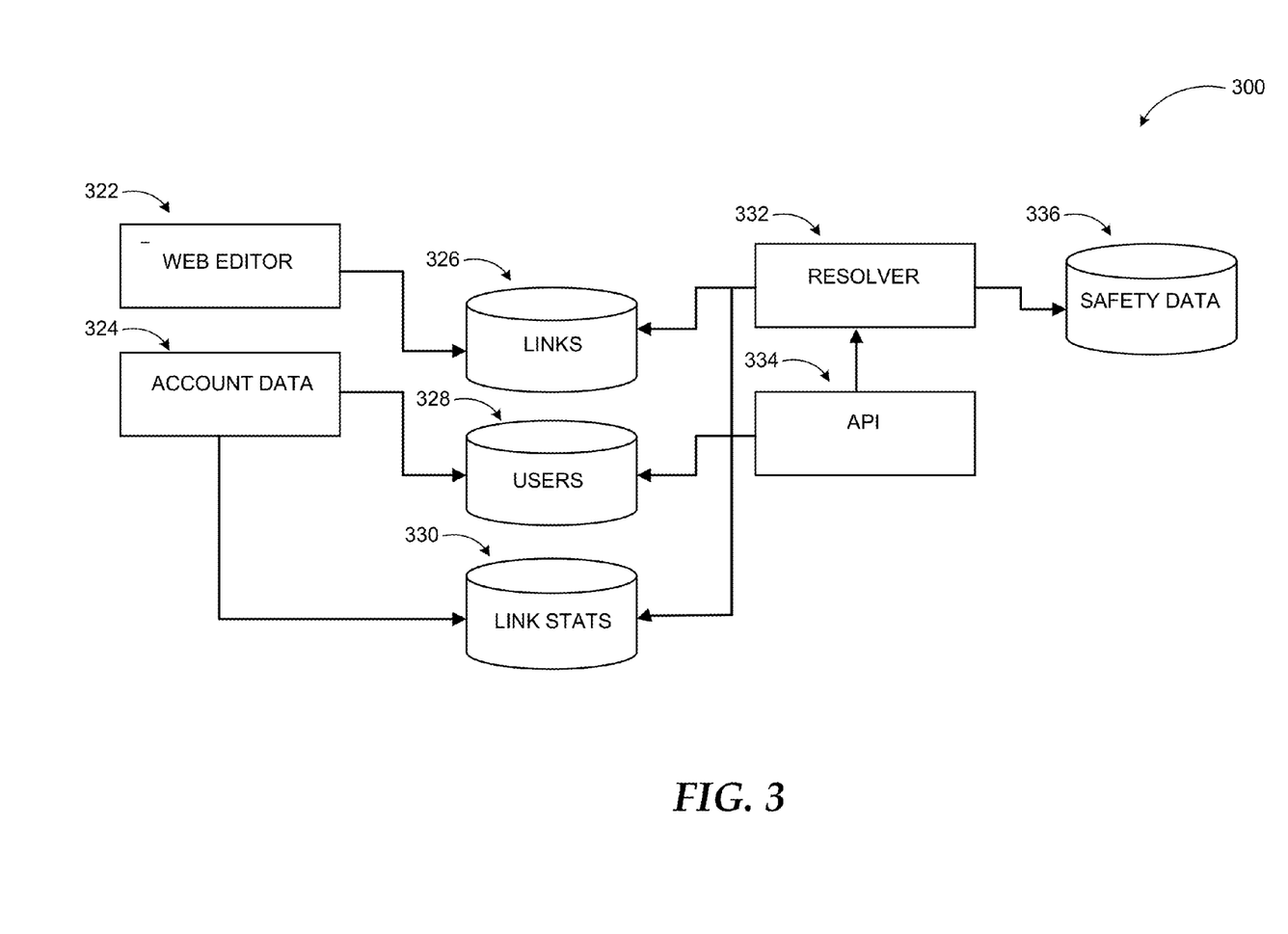
FIG. 3 illustrates interactions between major components and operations for safely shortening URLs in a system according to embodiments.

FIG. 3 illustrates interactions between major components and operations in diagram 300 for safely shortening URLs in a system according to embodiments. Web editor 322 may provide target URLs, which are transformed into short URLs by the shortening service's resolver module 332. Long and short URLs may be stored at a links data store 326. At resolution time, the service may also perform safety checks as discussed above and represented by safety data source 336 (e.g. a safe URL database). An API 334 may provide interaction with user data 328. User data 328 may be provided by account data 324 (e.g. social network site accounts of users, etc.). Information collected by resolver module 332 and account data 324 may be stored at a link statistics data store 330 for users and/or websites.

Partner websites may call a safe URL Shortening service application programming interface (API) and create a short URL when a user posts it. An identifier associated with the user may be provided at creation. According to some embodiments, the link (short URL) may be resolved to a block page instead of the original URL if the user identifier is on a restriction list and if the URL was resolved more than a predefined times within a preset period (e.g. 10 times within last 24 hours). This configurable control, also referred to as account throttling, may prevent rapid spreading of malicious content.

According to other embodiments, the safe URL shortening service may be integrated into websites by calling a service API and using an API key generated for each logged in user. The safe URL shortening service does not have to have its own login or password mechanism. According to further embodiments, the service may be integrated with a web service login mechanism (e.g. a social networking site) or other online identity providers. The integration aspect may reduce entry barrier for potential users and encourage them to use the perks of the service.

A safe URL shortening service may store a limited amount of information on the short URLs created by a user while he/she is logged in. Such information may include click count for each link, referral URL, browser type, operating system, time/date, location, and the like. The amount and collection window of the information may be configurable. Furthermore, users may be given an opportunity to opt in/out or configure what type of information is collected about them to address privacy concerns.

Data collected by a safe URL shortening service may potentially scale up to hundreds of millions of users, and billions of clicks. To mitigate the size of such large amounts of data, a service according to embodiments may employ data partitioning across multiple storage nodes. The data may be partitioned by the following fields:

TABLE 1

Example data partitioning fields

| | |
|---|---|
| URL | URL hash |
| User | Hash (user name + login source) |
| URL visit | URL hash + visit date/time |
| URL usage statistics | URL hash |

In such an architecture, every query to a table may contain the partitioning field. URL records may contain the user hash. In order to find all users' URLs, a {userhash, urlhash} table may serve as an index.

As discussed above, a system according to embodiments may store and query user related information such as user's profile, usage history, and similar data. Part of the information may be considered private or confidential depending on context. Thus, measures may be taken to protect the confidentiality of the information. For example, users may be given the opportunity to opt out from having their personal information stored or used. Additionally, user/usage related data may be protected employing measures like associating users with anonymous identifiers, password protection of the information, deletion of data after prescribed periods, and comparable ones.

While the example systems in FIG. 1 through FIG. 3 have been described with specific components and interactions, embodiments are not limited to these configurations and can be implemented with other components and configurations. Furthermore, embodiments are not limited to specific URL shortening or safety check mechanisms. Any shortening mechanism or safety check approach may be used for providing safe URL shortening using the principles described herein.

Figure 4:
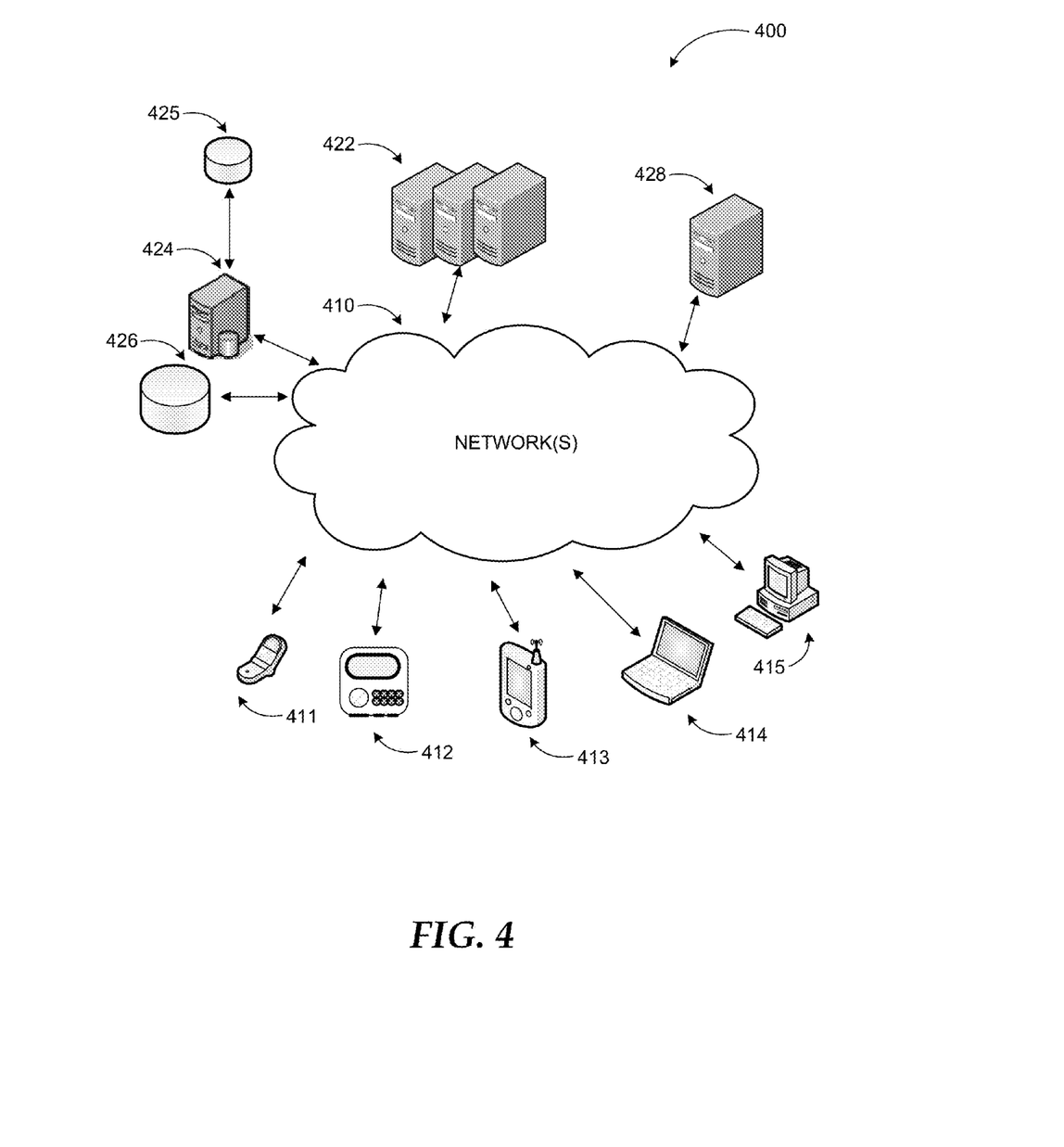
FIG. 4 is a networked environment, where a system according to embodiments may be implemented.

FIG. 4 includes diagram 400 of an example networked environment, where embodiments may be implemented. A platform providing safe URL shortening with above discussed features may be implemented via software executed over server 428 such as a hosted service. The platform may communicate with consuming applications on individual computing devices such as a cellular phone 411, smart automobile console 412, a handheld computer 413, a laptop computer 414, and desktop computer 415 ('client devices') through network(s) 410.

Users may execute any application such as web browsers on any one of the client devices 411-415 and access websites through long or short URLs. The platform providing safe URL shortening services may also communicate with URL publishers such as partners executed on servers 422 for determining safety of a website. Data associated with transformed URLs and website safety may be stored/retrieved in/from individual data sources such as data store 426 directly by the platform or data sources managed by a database server such as data store 425 managed by database server 424.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the Internet. Network(s) 410 may also comprise a plurality of distinct networks. Network(s) 410 provides communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a safe URL shortening system. Furthermore, the networked environments discussed in FIG. 4 are for illustration purposes only. Embodiments are not limited to the example applications, modules, or processes.

Figure 5:
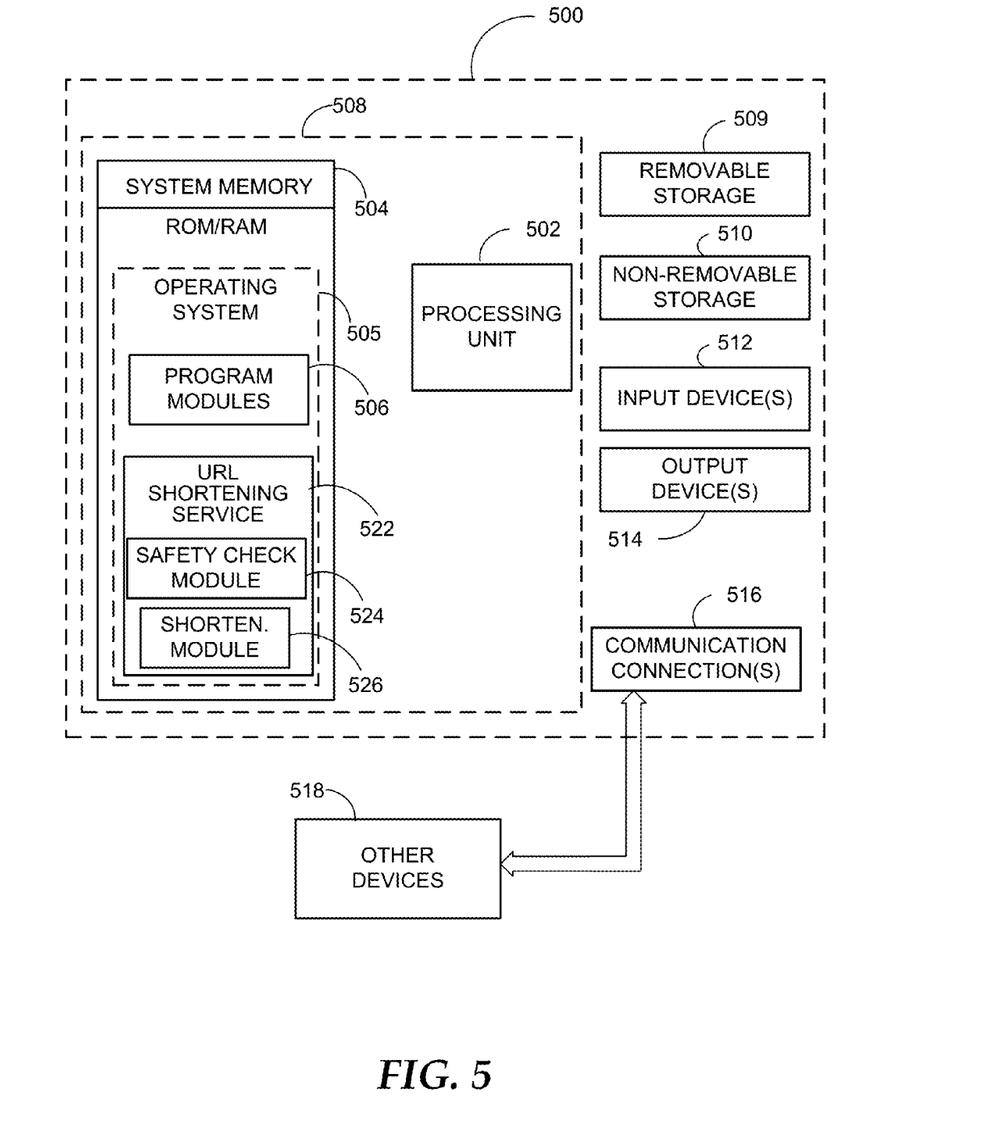
FIG. 5 is a block diagram of an example computing operating environment, where predictive data caching according to embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computer 500. In a basic configuration, computer 500 may be a server executing a URL shortening service and include at least one processing unit 502 and system memory 504. Computer 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, URL shortening service 522, safety check module 524, and shortening module 526.

Safety check module 524 and shortening module 526 may be separate modules or an integrated part of URL shortening service 522 providing transformation of long URLs into short URLs with safety check of target websites, account throttling, and other services discussed in more detail above enhancing user experience. This basic configuration is illustrated in FIG. 5 by those components within dashed line 508.

Computer 500 may have additional features or functionality. For example, the computer 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computer 500. Any such computer readable storage media may be part of computer 500. Computer 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computer 500 may also contain communication connections 516 that allow the device to communicate with other devices 518, such as over a wireless network in a distributed computing environment, a satellite link, a cellular link, and comparable mechanisms. Other devices 518 may include computer device(s) that execute web applications. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
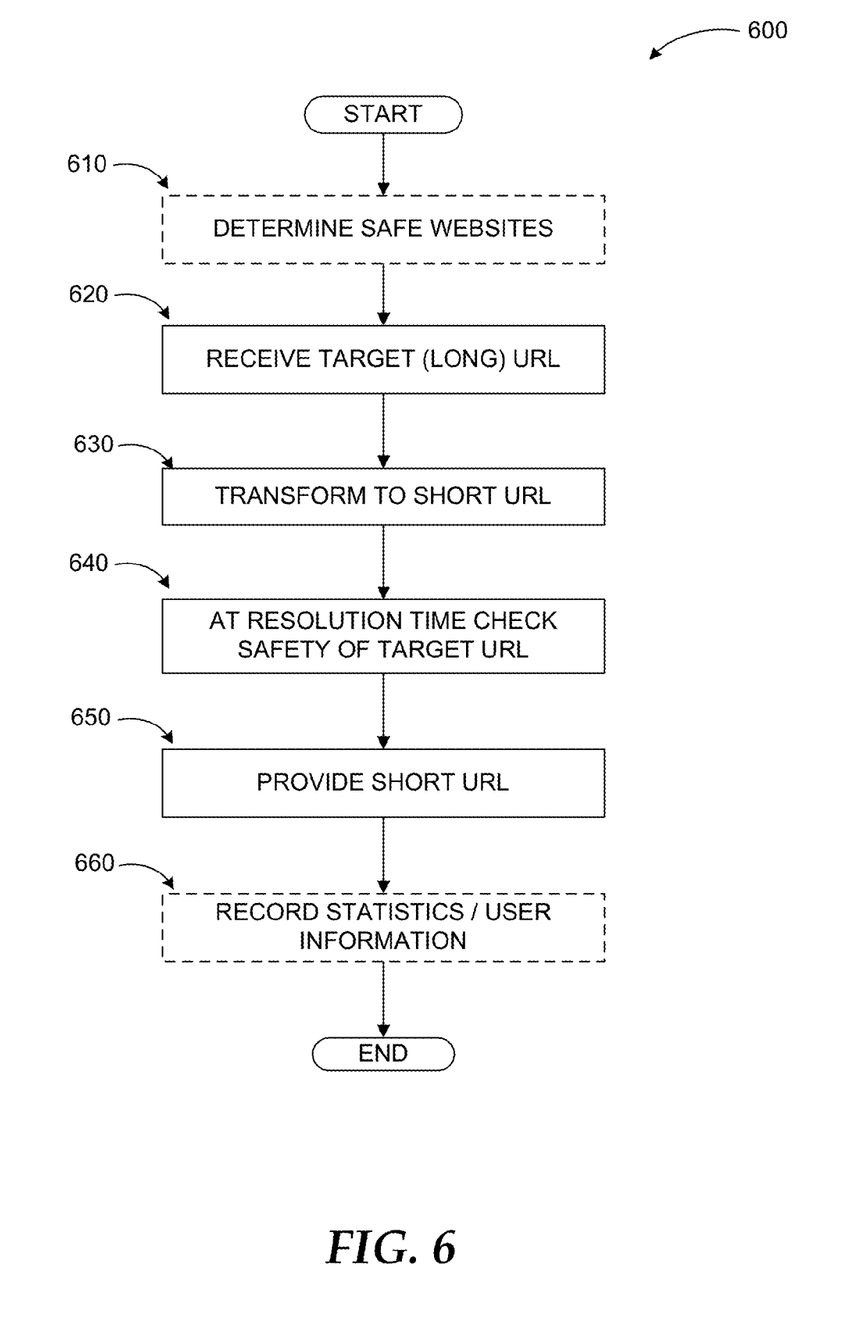
FIG. 6 illustrates a logic flow diagram for a process of providing safe URL shortening according to embodiments.

FIG. 6 illustrates a logic flow diagram for process 600 of providing safe URL shortening services according to embodiments. Process 600 may be implemented by any URL shortening service executed on one or more servers such as the ones described above.

Process 600 begins with optional operation 610, where safe websites may be determined. According to some embodiments, a list of safe websites may be maintained such that safety of a long URL can be certified promptly. At operation 620, a target URL or a long URL is received. The long URL is transformed into a short URL through hashing or similar mechanisms at operation 630.

At operation 640, a safety check of the URL is performed at resolution time of the short URL. This may be accomplished through a number of approaches such as checking with a third party website, crawling to the long URL, employing a number of machine learning algorithms, etc. At operation 650, the short URL may be provided to a user if it is a known good URL. If the target URL is a known bad URL, the link may be redirected to a block site. Alternatively, the user may be alerted that the original link is a known bad link or an unknown link and presented with the option to manually activate the link. Information about website usage (associated with the short URLs) or user information while the user is logged in may be collected at optional operation 660 for statistical purposes or ease of use for the user. Appropriate security measures may be taken to protect privacy of users.

The operations included in process 600 are for illustration purposes. Providing safe URL shortening may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for providing safe Uniform Resource Locator (URL) shortening, the method comprising:
   receiving a target URL;
   transforming the target URL to a short URL;
   at resolution time, performing a safety check on the target URL;
   if the target URL determined to be a safe URL, providing the short URL to a user; and
   continuously employing data partitioning across a plurality of storage nodes for storing collected statistical information with a {userhash, urlhash} table serving as an index, wherein the data partitioning includes data fields comprising URL-URL hash, User-Hash (user name+login source), URL visit-(URL hash+visit date/time), and URL usage statistics-URL hash pairs.

2. The method of claim 1, further comprising:
   if the target URL is determined to be an unsafe URL, redirecting the user to a block page.

3. The method of claim 1, further comprising:
   if a safety status of the target URL is undetermined, enabling the user to manually select between refusing to access the target URL and accessing the target URL.

4. The method of claim 1, further comprising:
   enabling one of a website and an application to call a safe URL shortening service application programming interface (API) and create a short URL when a user posts it.

5. The method of claim 4, further comprising:
   enabling integration of the URL shortening service into one of the website and the application by calling another URL shortening service API and using an API key generated for each logged in user.

6. The method of claim 1, further comprising:
   providing account throttling by restricting resolution of the short URL to a predefined number over a preset period for users in a restriction list.

7. The method of claim 1, further comprising:
   temporarily storing associated with a user while the user is logged in to the short URL.

8. The method of claim 7, wherein the stored information includes at least one from a set of: a click count for each link, a referral URL, a browser type of the user, an operating system of the user, a time/date of login, and a location of the user.

9. The method of claim 7, further comprising:
   receiving input from the user; and
   configuring at least one of a type of stored information and a duration of storage based on the received input.

10. A computing device for providing safe Uniform Resource Locator (URL) shortening, the computing device comprising:
    a memory;
    a processor coupled to the memory, the processor executing a URL shortening service, wherein the URL shortening service is configured to:
    receive a target URL;
    transform the target URL to a short URL;
    at resolution time, perform a safety check on the target URL;
    if the target URL determined to be a safe URL, provide the short URL to a user, else
    redirect the user to a block page with an option for the user to manually access the target URL; and
    employ data partitioning across a plurality of storage nodes to mitigate a size of the stored information, wherein the data partitioning includes data fields comprising URL-URL hash, User-Hash (user name+login source), URL visit-(URL hash+visit date/time), and URL usage statistics-URL hash pairs.

11. The computing device of claim 10, wherein the URL shortening service is further configured to store statistical information associated with the user's interactions with the target URL.

12. The computing device of claim 11, wherein the URL shortening service is further configured to enable users to one of opt out and configure a type of information to be stored.

13. The computing device of claim 11, wherein the URL shortening service is further configured to perform at least one from a set of: associate users with anonymous identifiers, provide password for the stored information, and delete the stored information after a predefined period.

14. The computing device of claim 10, wherein the URL shortening service is further configured to generate the short URL by employing one of: using an alphanumeric base, applying a hash function, using a randomly generated number, and using a user provided key.

15. The computing device of claim 10, wherein the target URL includes descriptive attributes representing at least one from a set of: a data hierarchy, a command structure, a transaction path, and session information.

16. A computer-readable memory device having instructions stored thereon for providing safe Uniform Resource Locator (URL) shortening, the instructions comprising:

receiving a target URL;

transforming the target URL to a short URL employing one of: using an alphanumeric base, applying a hash function, using a randomly generated number, and using a user provided key;

at resolution time, performing a safety check on the target URL;

if the target URL determined to be a safe URL, providing the short URL to a user, else redirecting the user to a block page with an option for the user to manually access the target URL;

providing account throttling by restricting resolution of the short URL to a predefined number over a preset period for users in a restriction list; and employing data partitioning across a plurality of storage nodes for storing collected statistical information with a {userhash, urlhash} table serving as an index.

17. The computer-readable memory device of claim 16, wherein a URL shortening service providing the safe URL shortening is integrated with a web service login mechanism.

* * * * *